(12) United States Patent
Haruki et al.

(10) Patent No.: US 12,177,264 B2
(45) Date of Patent: Dec. 24, 2024

(54) INFORMATION PROCESSING DEVICE AND COMPUTER PROGRAM PRODUCT

(71) Applicant: KABUSHIKI KAISHA TOSHIBA, Tokyo (JP)

(72) Inventors: Hiroyoshi Haruki, Kawasaki Kanagawa (JP); Fukutomo Nakanishi, Sumida Tokyo (JP); Satoshi Aoki, Kawasaki Kanagawa (JP); Daiki Ishihara, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 17/823,299

(22) Filed: Aug. 30, 2022

(65) Prior Publication Data

US 2023/0239327 A1 Jul. 27, 2023

(30) Foreign Application Priority Data

Jan. 21, 2022 (JP) ................. 2022-008102

(51) Int. Cl.
*H04L 9/40* (2022.01)
(52) U.S. Cl.
CPC ........ *H04L 63/205* (2013.01); *H04L 63/1433* (2013.01)
(58) Field of Classification Search
CPC .. H04L 63/205; H04L 63/1433; G06F 21/577
See application file for complete search history.

(56) References Cited

U.S. PATENT DOCUMENTS

| 10,637,883 B1 | 4/2020 | Segal et al. |
| 2013/0246605 A1* | 9/2013 | Mahadik ............. H04L 63/1433 709/224 |

(Continued)

FOREIGN PATENT DOCUMENTS

| JP | 2017-198836 A | 11/2017 |
| JP | 6548837 B2 | 7/2019 |

(Continued)

OTHER PUBLICATIONS

Yuki hARADA et al., "Evaluation of Anomaly Detection and Dataset in Control System," IEICE Symp. on Crypto. and Info. Sec., 7 pages, and machine translation, 10 pages (2021).

(Continued)

*Primary Examiner* — Shanto Abedin
(74) *Attorney, Agent, or Firm* — Finnegan, Henderson, Farabow, Garrett & Dunner, LLP

(57) ABSTRACT

An attack control device according to an embodiment is provided with a storage unit and one or more hardware processors configured to function as a selection unit, a determination unit, and a calculation unit. The storage unit associates and stores a normal communication data model representing a model of communication data of a normal system, with each network segment. The selection unit specifies the network segment based on the communication prediction data predicted upon execution of the attack scenario and selects the normal communication data model associated with the network segment. The determination unit determines the similarity degree between the normal communication data represented by the normal communication data model, and the communication prediction data. The calculation unit calculates an effectiveness degree of the attack scenario to be higher as the similarity degree is higher.

10 Claims, 15 Drawing Sheets

(56) References Cited

U.S. PATENT DOCUMENTS

| | | | |
|---|---|---|---|
| 2017/0006055 A1 | 1/2017 | Strom et al. | |
| 2017/0318050 A1* | 11/2017 | Hassanzadeh | H04L 63/1433 |
| 2018/0103058 A1* | 4/2018 | St. Pierre | H04L 63/1441 |
| 2018/0234435 A1* | 8/2018 | Cohen | H04L 63/1416 |
| 2019/0294803 A1* | 9/2019 | Yamamoto | G06F 21/57 |
| 2020/0145446 A1 | 5/2020 | Deardorff et al. | |
| 2021/0029154 A1* | 1/2021 | Picard | H04L 63/1441 |
| 2021/0064762 A1* | 3/2021 | Salji | G06F 9/455 |
| 2021/0157909 A1 | 5/2021 | Yamamoto et al. | |
| 2022/0067171 A1 | 3/2022 | Nakanishi et al. | |
| 2022/0116413 A1* | 4/2022 | Kurakami | H04L 63/0884 |
| 2022/0131894 A1* | 4/2022 | Hassanzadeh | H04L 63/1433 |
| 2022/0156382 A1 | 5/2022 | Ogura et al. | |
| 2022/0182406 A1 | 6/2022 | Inokuchi | |
| 2023/0141928 A1* | 5/2023 | Sterba | H04L 63/1416 726/22 |

FOREIGN PATENT DOCUMENTS

| | | |
|---|---|---|
| JP | 2022-41790 A | 3/2022 |
| JP | 2022-080635 A | 5/2022 |
| WO | WO 2018/100718 A1 | 6/2018 |
| WO | WO 2019/073557 A1 | 4/2019 |
| WO | WO 2020/250299 A1 | 12/2020 |

OTHER PUBLICATIONS

Japan Patent Office, Office Action in JP App. No. 2022-008102, 3 pages, and machine translation, 5 pages (Oct. 1, 2024).

\* cited by examiner

| ATTACK SCENARIO NUMBER | ATTACK-SOURCE IDENTIFIER | ATTACK-TARGET IDENTIFIER | ATTACK-MODULE IDENTIFIER |
|---|---|---|---|
| S01 | 192.168.0.2 | 192.168.0.5 | ms10_061_spoolss |
| | 192.168.1.5 | 192.168.1.10 | modbusclient |
| S02 | 192.168.0.2 | 192.168.0.8 | cve_2019_0708_bluekeep_rce |
| | 192.168.1.8 | 192.168.1.10 | modbusclient |
| ... | ... | ... | ... |

FIG.4

| ATTACK-MODULE IDENTIFIER | ATTACK-SOURCE IDENTIFIER | ATTACK-TARGET IDENTIFIER | ATTACK COMMUNICATION DATA ||||
|---|---|---|---|---|---|---|
| | | | TIME | TRANSMISSION-SOURCE IDENTIFIER | TRANSMISSION-DESTINATION IDENTIFIER | PAYLOAD |
| ms10_061_spoolss | 10.0.0.1 | 10.0.0.2 | 00:00 | 10.0.0.1 | 10.0.0.2 | "#%)('&!%~&"$%* |
| | | | 00:01 | 10.0.0.2 | 10.0.0.1 | $('&&*+"=)('&$(=((' |
| | | | ... | ... | ... | ... |
| cve_2019_0708_bluekeep_rce | 10.0.0.1 | 10.0.0.2 | 01:30 | 10.0.0.2 | 10.0.0.1 | &"$%;/.¥"#%)('&!% |
| | | | 12:00 | 10.0.0.1 | 10.0.0.2 | +"=)('&$(=(('&%~ |
| | | | 12:01 | 10.0.0.2 | 10.0.0.1 | &"$%%*+[,&!%~ |
| | | | ... | ... | ... | ... |
| modbusclient | 172.16.0.3 | 172.16.0.5 | 12:55 | 10.0.0.1 | 10.0.0.1 | +"=)(=,'+ i$')'&&* |
| | | | 15:00 | 172.16.0.3 | 172.16.0.5 | =)('&$(=(('&%~=! |
| | | | 15:01 | 172.16.0.5 | 172.16.0.3 | +"=)('&&(=! $('&& |
| | | | ... | ... | ... | ... |
| ... | ... | ... | 15:40 | 172.16.0.5 | 172.16.0.3 | %"$%%*"#%)('&!% |
| | | | ... | ... | ... | ... |

FIG.5

| ATTACK MEANS NUMBER | ATTACK- SOURCE IDENTIFIER | ATTACK- TARGET IDENTIFIER | ATTACK- MODULE IDENTIFIER | COMMUNICATION PREDICTION DATA ||||
|---|---|---|---|---|---|---|---|
| | | | | TIME | TRANSMISSION- SOURCE IDENTIFIER | TRANSMISSION- DESTINATION IDENTIFIER | PAYLOAD |
| A01 | 192.168.0.2 | 192.168.0.5 | ms10_061_ spoolss | 00:00 | 192.168.0.2 | 192.168.0.5 | "#%)('&!%~&'$%* |
| | | | | 00:01 | 192.168.0.5 | 192.168.0.2 | $)('&&*+'=)('&$(=(' |
| | | | | ... | ... | ... | ... |
| | | | | 01:30 | 192.168.0.5 | 192.168.0.2 | &"$%,/¥"#%)('&!% |
| A02 | 192.168.1.5 | 192.168.1.10 | modbusclient | 15:00 | 192.168.1.5 | 192.168.1.10 | =)('&$(=(('&%~! |
| | | | | 15:01 | 192.168.1.10 | 192.168.1.5 | +'"=)('&$(=(! $('&& |
| | | | | ... | ... | ... | ... |
| | | | | 15:40 | 192.168.1.10 | 192.168.1.5 | %"$%%*'#%)('&!% |
| A03 | 192.168.0.2 | 192.168.0.8 | cve_2019_ 0708_ bluekeep_rce | 12:00 | 192.168.0.2 | 192.168.0.8 | +'"=)('((~=! $('&&* |
| | | | | 12:01 | 192.168.0.8 | 192.168.0.2 | &"$%%*+'[;'&!%~ |
| | | | | ... | ... | ... | ... |
| | | | | 12:55 | 192.168.0.8 | 192.168.0.2 | +'"=)('((~=! $('&&* |
| A04 | 192.168.1.8 | 192.168.1.10 | modbusclient | 15:00 | 192.168.1.8 | 192.168.1.10 | =)('&$(=(('&%~! |
| | | | | 15:01 | 192.168.1.10 | 192.168.1.8 | +'"=)('&$(=(! $('&& |
| | | | | ... | ... | ... | ... |
| | | | | 15:40 | 192.168.1.10 | 192.168.1.8 | %"$%%*'#%)('&!% |

FIG.6

| NETWORK SEGMENT | NORMAL COMMUNICATION DATA MODEL |
|---|---|
| 192.168.0.0/24 | Abaflteobf-e09kba |
| 192.168.1.0/24 | 04ktb;glagAfgar03 |
| ... | ... |

FIG.7

| ATTACK MEANS NUMBER | ATTACK-SOURCE IDENTIFIER | ATTACK-TARGET IDENTIFIER | ATTACK-MODULE IDENTIFIER | SIMILARITY-DEGREE DETERMINATION RESULT |
|---|---|---|---|---|
| A01 | 192.168.0.2 | 192.168.0.5 | ms10_061_spoolss | 1 |
| A02 | 192.168.1.5 | 192.168.1.10 | modbusclient | 1 |
| A03 | 192.168.0.2 | 192.168.0.8 | cve_2019_0708_bluekeep_rce | 0 |
| A04 | 192.168.1.8 | 192.168.1.10 | modbusclient | 1 |
| ... | ... | ... | ... | ... |

FIG.8

| ATTACK SCENARIO NUMBER | EFFECTIVENESS DEGREE |
|---|---|
| S01 | 1 |
| S02 | 0.1 |
| ... | ... |

FIG.11

| ATTACK SCENARIO NUMBER | COMMUNICATION PREDICTION DATA | | | | |
| --- | --- | --- | --- | --- | --- |
| | TIME | TRANSMISSION-SOURCE IDENTIFIER | TRANSMISSION-DESTINATION IDENTIFIER | PAYLOAD | |
| S01 | 00:00 | 192.168.0.2 | 192.168.0.5 | "#%)('&!%~&"$%* | C001 |
| | 00:01 | 192.168.0.5 | 192.168.0.2 | $('&&*+"=)('&$(=((' | C002 |
| | ... | ... | ... | ... | |
| | 01:30 | 192.168.0.5 | 192.168.0.2 | &"$%;/.¥"#%)('&!% | C100 |
| | 15:00 | 192.168.1.5 | 192.168.1.10 | =)('&$(=(('&%~=! | C101 |
| | 15:01 | 192.168.1.10 | 192.168.1.5 | +"=)('&$(=(! $('&& | C102 |
| | ... | ... | ... | ... | |
| | 15:40 | 192.168.1.10 | 192.168.1.5 | %"$%%*"#%)('&!% | C150 |
| S02 | ... | ... | ... | ... | |

FIG.12

| | COMMUNICATION PREDICTION DATA | | | NORMAL COMMUNICATION DATA MODEL |
|---|---|---|---|---|
| TIME | TRANSMISSION-SOURCE IDENTIFIER | TRANSMISSION-DESTINATION IDENTIFIER | PAYLOAD | |
| C001 ⟩ 00:00 | 192.168.0.2 | 192.168.0.5 | "#%)('&!%~&"$%* | Abafiteobf-e09kba |
| C002 ⟩ 00:01 | 192.168.0.5 | 192.168.0.2 | $('&&*+"=)('&$(=((' | |
| ⋮ | ⋮ | ⋮ | ⋮ | |
| C100 ⟩ 01:30 | 192.168.0.5 | 192.168.0.2 | &"$%;/.¥"#%)('&!% | |
| C101 ⟩ 15:00 | 192.168.1.5 | 192.168.1.10 | =)('&$(=(('&%~=! | 04ktb;glagAfgar03 |
| C102 ⟩ 15:01 | 192.168.1.10 | 192.168.1.5 | +"=)('&$(=!·$/'&& | |
| ⋮ | ⋮ | ⋮ | ⋮ | |
| C150 ⟩ 15:40 | 192.168.1.10 | 192.168.1.5 | %"$%%"#%)('&!% | ⋮ |

INFORMATION PROCESSING DEVICE AND COMPUTER PROGRAM PRODUCT

CROSS-REFERENCE TO RELATED APPLICATIONS

This application is based upon and claims the benefit of priority from Japanese Patent Application No. 2022-008102, filed on Jan. 21, 2022; the entire contents of which are incorporated herein by reference.

FIELD

Embodiments described herein relate generally to an information processing device and a computer program product.

BACKGROUND

Technique for finding out what cyber attack methods are effective against systems in order to protect the information systems from cyber attacks have been conventionally known. For example, there is a technique which compares attack samples and a single normal-state model and extracts the attack samples which have high risks of attacking the system. For example, there is also a technique which calculates important scores of attacks based on the number of attack paths, attack costs, restoration costs, success probabilities, etc.

However, it has been difficult for the conventional techniques to evaluate the resistance against cyber attacks with high accuracy in a system which has multi-level network segments.

BRIEF DESCRIPTION OF THE DRAWINGS

FIG. 4 is a diagram illustrating a data example of an attack-communication-data storage unit of the first embodiment;

FIG. 5 is a diagram illustrating a data example of a communication-prediction-data storage unit of the first embodiment;

FIG. 6 is a diagram illustrating a data example of a normal-communication-data-model storage unit of the first embodiment;

FIG. 7 is a diagram illustrating a data example of a determination-result storage unit of the first embodiment;

FIG. 8 is a diagram illustrating a data example of an effectiveness-degree storage unit of the first embodiment;

FIG. 11 is a diagram illustrating a data example of a communication-prediction-data storage unit of the second embodiment;

FIG. 12 is a diagram illustrating a data example of an attack-scenario/model storage unit of the second embodiment;

DETAILED DESCRIPTION

An information processing device according to an embodiment includes a storage unit and one or more hardware processors configured to function as a selection unit, a determination unit, and a calculation unit. The storage unit is configured to associate and store a normal communication data model with each network segment, where the normal communication data model represents a model of communication data of a normal system. The selection unit is configured to specify a network segment based on communication prediction data predicted upon execution of an attack scenario and select the normal communication data model associated with the network segment. The determination unit is configured to determine a similarity degree between the normal communication data represented by the normal communication data model and the communication prediction data. The calculation unit is configured to calculate an effectiveness degree of the attack scenario to be higher as the similarity degree is higher.

Hereinafter, with reference to accompanying drawings, embodiments of an information processing device and a computer program product will be described in detail.

First Embodiment

First, an example of a functional configuration of an information processing device of a first embodiment will be described.

Example of Functional Configuration

Figure 1:
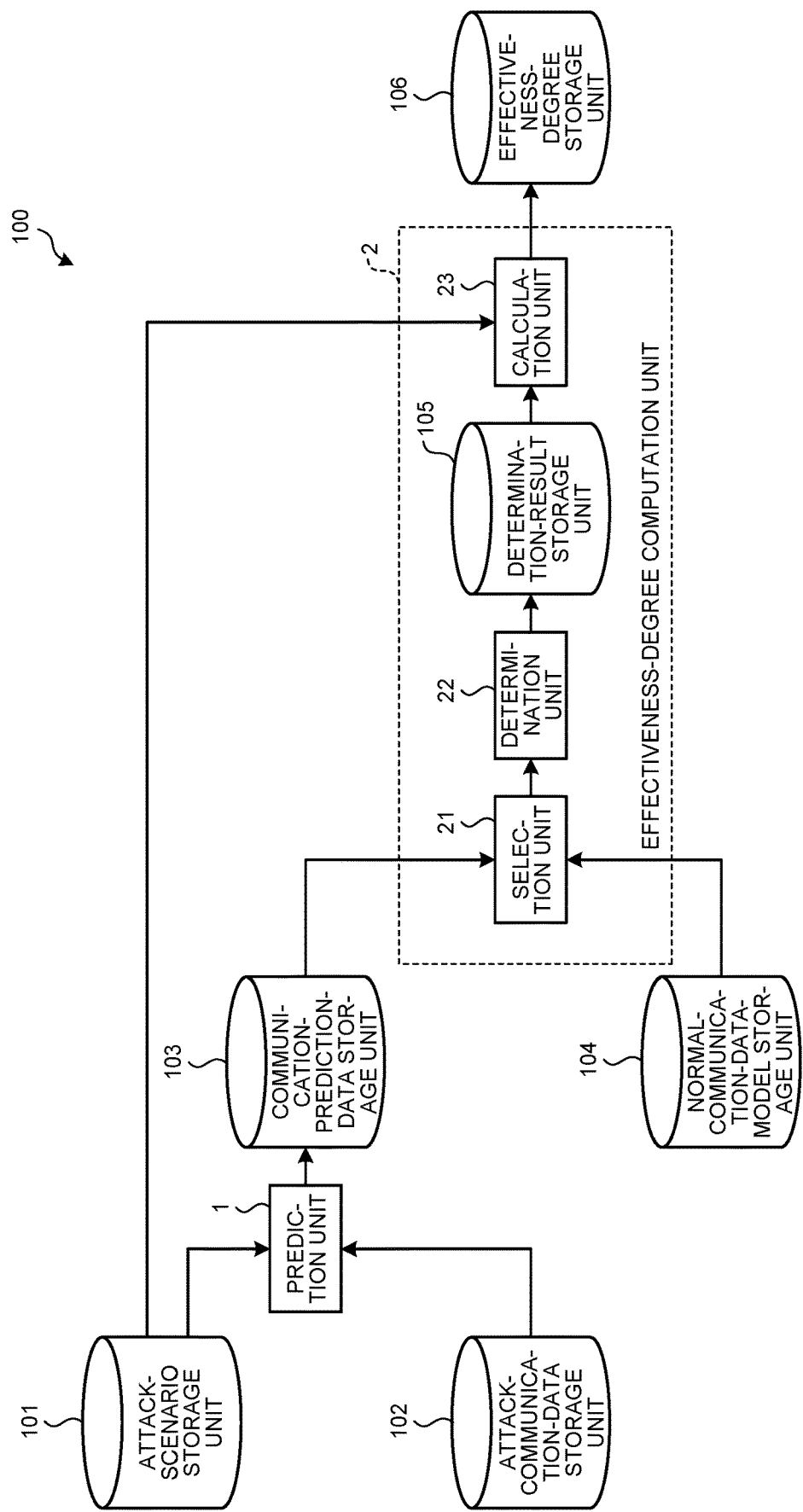
FIG. 1 is a diagram illustrating an example of a functional configuration of an information processing device of a first embodiment.

FIG. 1 is a diagram illustrating an example of a functional configuration of an information processing device 100 of the first embodiment. The information processing device 100 of the first embodiment is provided with a prediction unit 1, an effectiveness-degree computation unit 2, an attack-scenario storage unit 101 (FIG. 2), an attack-communication-data storage unit 102 (FIG. 4), a communication-prediction-data storage unit 103 (FIG. 5), a normal-communication-data-model storage unit 104 (FIG. 6), and an effectiveness-degree storage unit 106 (FIG. 8). The effectiveness-degree computation unit 2 is provided with a selection unit 21, a determination unit 22, a calculation unit 23, and a determination-result storage unit 105 (FIG. 7).

The prediction unit 1 predicts communication prediction data based on attack scenarios of the attack-scenario storage unit 101 and attack communication data of the attack-communication-data storage unit 102.

Data Example of Attack-Scenario Storage Unit

Figures 2, 3:
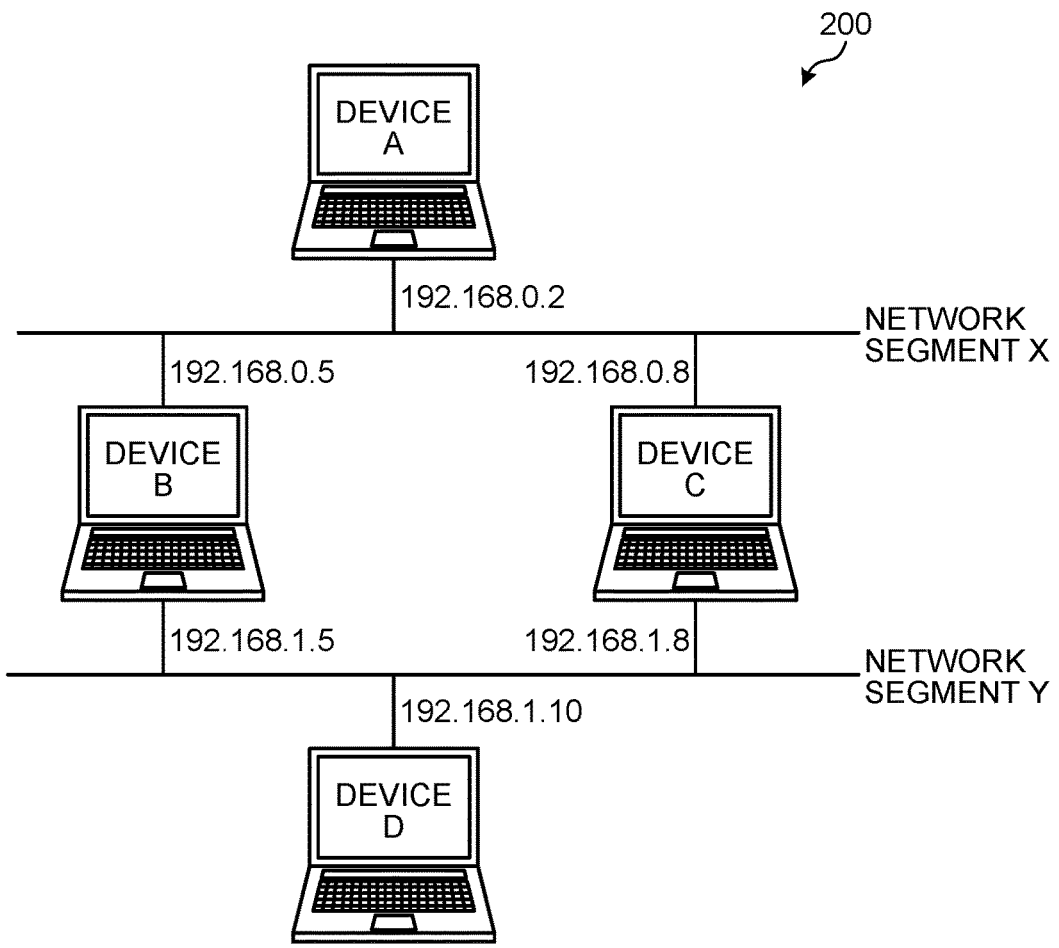
FIG. 2 is a diagram illustrating a data example of an attack-scenario storage unit of the first embodiment.
FIG. 3 is a diagram illustrating an example of an attack-evaluation-target system of the first embodiment.

FIG. 2 is a diagram illustrating a data example of the attack-scenario storage unit 101 of the first embodiment. The data of the attack-scenario storage unit 101 of the first embodiment includes at least attack scenario numbers, attack-source identifiers, attack-target identifiers, and attack-module identifiers. The attack scenario numbers are the numbers which identify attack scenarios. The attack-source identifiers are the information which identifies attack sources. The attack-target identifiers are the information which identifies attack targets. The attack-module identifiers are the information which identifies attack-target modules (for example, attack module names).

An example of FIG. 2 illustrates a case in which an attack-evaluation-target system serving as an attack evaluation target of the information processing device 100 is a device configuration of FIG. 3.

Example of Attack-Evaluation-Target System

FIG. 3 is a diagram illustrating an example of the device configuration of an attack-evaluation-target system 200 of the first embodiment. The attack-evaluation-target system 200 of the first embodiment is provided with a device A, a device B, a device C, and a device D. The device A, the device B, and the device C are directly connected by a network segment X and have 192.168.0.2, 192.168.0.5, and 192.168.0.8, respectively, as identifiers. Also, the device B, the device C, and the device D are directly connected by a network segment Y and have 192.168.1.5, 192.168.1.8, and 192.168.1.10, respectively, as identifiers.

The example of FIG. 2 illustrates an attack scenario of a case in which the device A breaks into the device D in the attack-evaluation-target system 200.

For example, an attack scenario number S01 is a method combining an attack means of "the attack-source identifier: 192.168.0.2, the attack-target identifier: 192.168.0.5, and the attack-module identifier: ms10_061_spoolss" and an attack means of "the attack-source identifier: 192.168.1.5, the attack-target identifier: 192.168.1.10, and the attack module: modbusclient".

Also, for example, an attack scenario number S02 is a method combining an attack means of "the attack-source identifier: 192.168.0.2, the attack-target identifier: 192.168.0.8, and the attack module: cve_2019_0708_bluekeep_rce" and an attack means of "the attack-source identifier: 192.168.1.8, the attack-target identifier: 192.168.1.10, and the attack-module identifier: modbusclient".

Data Example of Attack-Communication-Data Storage Unit

FIG. 4 is a diagram illustrating a data example of the attack-communication-data storage unit 102 of the first embodiment. The data of the attack-communication-data storage unit 102 of the first embodiment includes at least attack-module identifiers, attack-source identifiers, attack-target identifiers, and attack communication data. The descriptions of the attack-module identifiers, the attack-source identifiers, and the attack-target identifiers are the same as those of FIG. 2 and are therefore omitted.

The attack communication data includes at least time, a transmission-source identifier, a transmission-destination identifier, and payload of each communication. This attack communication data is the communication data generated when an attack is made based on the attack-module identifier, the attack-source identifier, and the attack-target identifier. The time indicates the time at which the communication is started, but the value of the time may be arbitrary. The transmission-source identifier is the information which identifies a transmission source in the communication. The transmission-destination identifier is the information which identifies a transmission destination in the communication. The payload is a data main body transmitted in the communication. The value of the payload may be arbitrary.

FIG. 4 illustrates the attack communication data supporting various attack means. For example, the attack communication data of an attack means "an attack-module identifier ms10_061_spoolss, an attack-source identifier: 10.0.0.1, and an attack-target identifier: 10.0.0.2" includes one or more attack packets such as "time: 00:00, a transmission-source identifier: 10.0.0.1, a transmission-destination identifier: 10.0.0.2, and payload: "#%) ('&!%~&"$%*"" and "time: 00:01, a transmission-source identifier: 10.0.0.2, a transmission-destination identifier: 10.0.0.1, and payload: $('&&*+"=)('&$(=((".

Data Example of Communication-Prediction-Data Storage Unit

FIG. 5 is a diagram illustrating a data example of the communication-prediction-data storage unit 103 of the first embodiment. The data of the communication-prediction-data storage unit 103 of the first embodiment includes at least attack means numbers, attack-source identifiers, attack-target identifiers, attack-module identifiers, and communication prediction data.

The attack means number is the number which identifies an attack means (a combination of an attack-source identifier, an attack-target identifier, and an attack-module identifier). The descriptions of the attack-source identifiers, the attack-target identifiers, and the attack-module identifier are the same as those of FIG. 2 and are therefore omitted.

The communication prediction data includes at least time, a transmission-source identifier, a transmission-destination identifier, and payload of each communication predicted by the prediction unit 1. The descriptions of the time, the transmission-source identifiers, the transmission-destination identifiers, and the payload are the same as those of FIG. 4 and are therefore omitted.

The prediction unit 1 predicts the communication prediction data according to the attack communication data (see FIG. 4), which represents the communication data of a case in which an attack module identified by an attack-module identifier is executed, and according to the attack-source identifier and the attack-target identifier.

FIG. 5 illustrates the communication prediction data supporting various attack means. For example, the communication prediction data of the attack means of the attack means number: A01 (an attack-source identifier: 192.168.0.2, an attack-target identifier: 192.168.0.5, and an attack-module identifier: ms10_061_spoolss) includes one or more prediction packets such as "time: 00:00, a transmission-source identifier: 192.168.0.2, a transmission-destination identifier 192.168.0.5, and payload: "#%) ('&!%~&"$%*"" and "time: 00:01, a transmission-source identifier 192.168.0.5, a transmission-destination identifier 192.168.0.2, and payload: $('&&*+"=)('&$(=((".

Returning to FIG. 1, the selection unit 21 specifies a network segment based on the communication prediction data predicted upon execution of the attack scenario and selects normal communication data model associated with the network segment.

Data Example of Normal-Communication-Data-Model Storage Unit

FIG. 6 is a diagram illustrating a data example of the normal-communication-data-model storage unit 104 of the first embodiment. The data of the normal-communication-data-model storage unit 104 of the first embodiment includes at least a network segment and a normal communication data model. The network segment represents a divided network. The normal communication data model represents a model of communication data of a normal system in the network segment.

An example of FIG. 6 illustrates that, for example, a normal communication data model with respect to a network segment "192.168.0.0/24" is "Abaflteobf-e09kba".

Returning to FIG. 1, the determination unit 22 determines a similarity degree between the normal communication data represented by the normal communication data model selected by the selection unit 21 and the communication prediction data predicted by the prediction unit 1.

Data Example of Determination-Result Storage Unit

FIG. 7 is a diagram illustrating a data example of the determination-result storage unit 105 of the first embodiment. The data of the determination-result storage unit 105 of the first embodiment includes at least an attack means number, a transmission-source identifier, a transmission-destination identifier, an attack-module identifier, and a similarity-degree determination result. The descriptions of the attack means number, the transmission-source identifier, the transmission-destination identifier, and the attack-module identifier are the same as those of FIG. 5 and are therefore omitted.

The similarity-degree determination result represents a result of the similarity degree (for example, 1: similar, 0: not similar) determined by the determination unit 22. The similarity degree is not limited to a discrete value such as 0 or 1, but may be expressed by continuous values representing the level of the similarity degree by the magnitude of the values.

An example of FIG. 7 illustrates that, for example, the similarity-degree determination result with respect to the attack means of the attack means number: A01 (an attack-source identifier: 192.168.0.2, an attack-target identifier: 192.168.0.5, and an attack-module identifier: ms10_061_spoolss) is 1 (similar).

Also, for example, it is represented that the similarity-degree determination result with respect to the attack means of the attack means number: A03 (an attack-source identifier: 192.168.0.2, an attack-target identifier: 192.168.0.8, and an attack-module identifier: cve_2019_0708_bluekeep_rce) is 0 (not similar).

Returning to FIG. 1, the calculation unit 23 calculates the effectiveness degree of the attack scenario to be higher as the similarity degree determined by the determination unit 22 is higher.

Data Example of Effectiveness-Degree Storage Unit

FIG. 8 is a diagram illustrating a data example of the effectiveness-degree storage unit 106 of the first embodiment. The data of the effectiveness-degree storage unit 106 of the first embodiment includes at least an attack scenario number and an effectiveness degree. The descriptions of the attack scenario number are the same as those of FIG. 2 and are therefore omitted. The effectiveness degree represents the effectiveness of the attack scenario identified by the attack scenario number. An example of a calculation method of the effectiveness degree will be described later.

The example of FIG. 8 illustrates that, for example, the effectiveness degree of the attack scenario identified by an attack scenario number S01 is 1, while the effectiveness degree of the attack scenario identified by an attack scenario number S02 is 0.1.

Example of Information Processing Method

Figure 9:
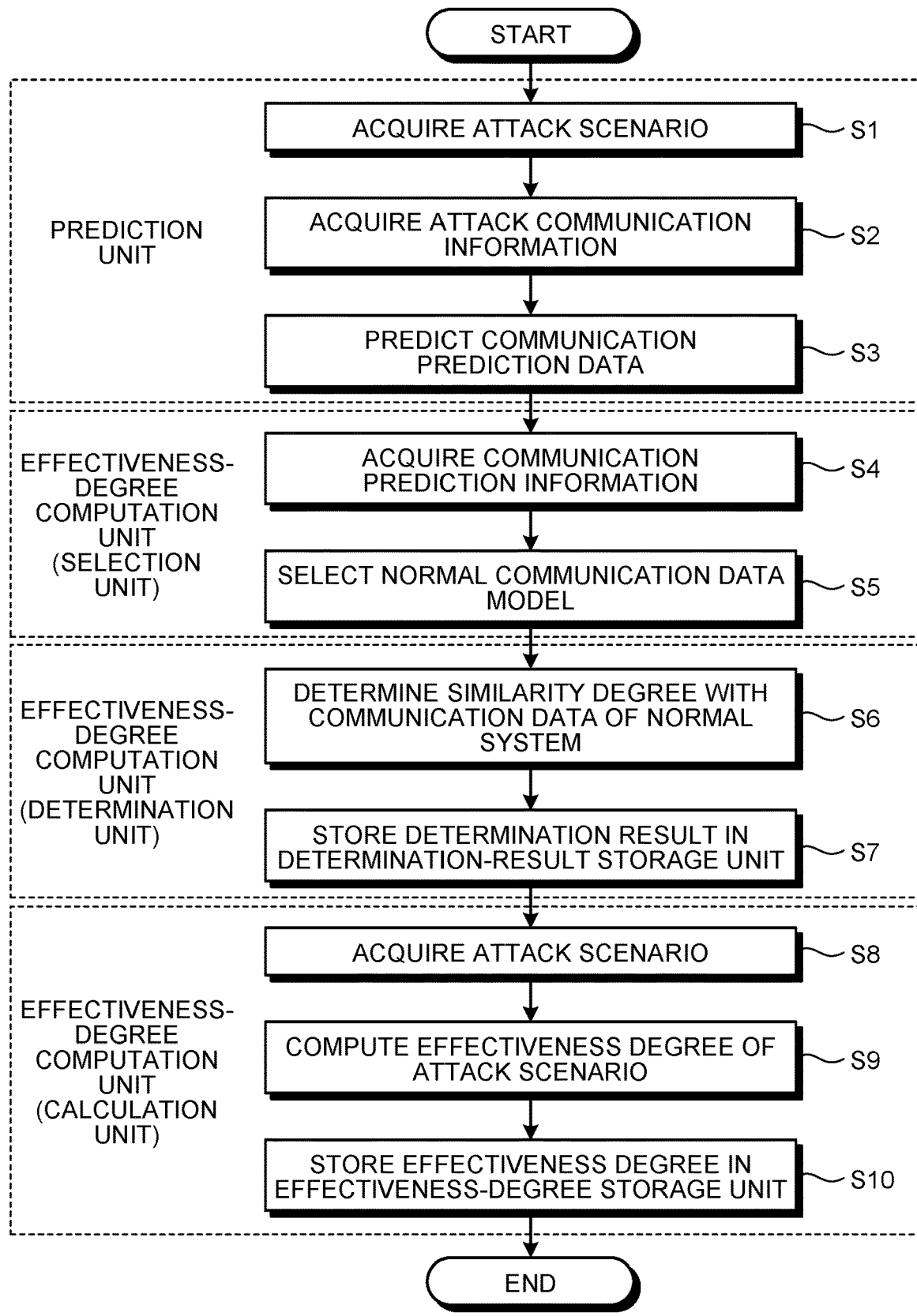
FIG. 9 is a flow chart illustrating an example of an information processing method of the first embodiment.

FIG. 9 is a flow chart illustrating an example of an information processing method of the first embodiment. First, the prediction unit 1 acquires, from the attack-scenario storage unit 101, an attack scenario (an attack scenario number, an attack-source identifier, an attack-target identifier, an attack-module identifier) (step S1).

Then, the prediction unit 1 acquires, from the attack-communication-data storage unit 102, an attack-source identifier, an attack-target identifier, and attack communication data (a transmission-source identifier, a transmission-destination identifier, and payload), which are at least one piece of attack communication information identified by the attack-module identifier of the attack scenario (step S2).

Then, the prediction unit 1 predicts communication prediction data based on the attack-source identifier and the attack-target identifier of the attack communication information and based on the attack-source identifier and the attack-target identifier of the attack scenario (step S3). Specifically, the prediction unit 1 predicts the transmission-source identifier and the transmission-destination identifier of the communication prediction data by changing (modifying) the transmission-source identifier and the transmission-destination identifier of the attack communication data depending on an environment (for example, an attack-source identifier, attack-target identifier, etc.) of the attack-evaluation-target system 200. If it is necessary to change the payload of the communication prediction data according to the predicted transmission-source identifier and the transmission-destination identifier, the prediction unit 1 also changes the payload. Then, the prediction unit 1 gives an attack means number, which is an arbitrary unique identifier, to the combined data of the attack-source identifier, the attack-target identifier, and the attack-module identifier of the attack scenario and the communication prediction data and stores the data in the communication-prediction-data storage unit 103.

Then, the selection unit 21 acquires the communication prediction information (the attack means number, the attack-source identifier, the attack-target identifier, the attack-module identifier, and the communication prediction data) from the communication-prediction-data storage unit 103 (step S4).

Then, the selection unit 21 acquires, from the normal-communication-data-model storage unit 104, the normal communication data model corresponding to the network segment including the attack-source identifier and the attack-target identifier (step S5). More specifically, the selection unit 21 specifies the network segment according to the attack-source identifier and the attack-target identifier and selects the normal communication data model associated with the network segment.

Then, the determination unit 22 determines the similarity degree between the communication prediction data acquired in step S4 and the communication data of the normal system represented by the normal communication data model selected in step S5 (step S6). For example, the determination unit 22 causes a recent attack detection system (IDS: Intrusion Detection System) to carry out learning with the normal communication data model and applies the communication prediction data to the learning result. Specifically, in a conceivable method, the determination unit 22 determines that there is similarity (value: 1) if attack is not detected by an attack detection system (cannot be discriminated from normal communication); and the determination unit 22 determines that there is not similarity (value: 0) if attack is detected (can be discriminated from normal attack). Then, the determination unit 22 associates the determination result of the similarity degree with the attack means number, the attack-source identifier, the attack-target identifier, and the attack-module identifier and stores that in the determination-result storage unit 105 (step S7).

Then, the calculation unit 23 acquires, from the attack-scenario storage unit 101, the attack scenario (the attack scenario number, the attack-source identifier, the attack-target identifier, and the attack-module identifier) (step S8).

Then, the calculation unit 23 calculates (computes) the effectiveness degree of the attack scenario acquired in step S8 (step S9). Specifically, first, the calculation unit 23 acquires, from the determination-result storage unit 105, the similarity-degree determination results associated with the attack means specified by the attack-source identifier, the attack-target identifier, and the attack-module identifier of the attack scenario. For example, the calculation unit 23 sets an effectiveness degree of 1 with respect to a similar attack means, sets an effectiveness degree of 0.1 with respect to an attack means which is not similar, and computes the effectiveness degree of the attack scenario by multiplication. Then, the calculation unit 23 associates the effectiveness degree computed in step S9 with the attack scenario number and stores that in the effectiveness-degree storage unit 106 (step S10).

Specific Example

A case in which the effectiveness degrees of the attack scenarios exemplified in FIG. 2 are evaluated with respect to the attack-evaluation-target system 200 of FIG. 3 will be described in detail. First, the prediction unit 1 acquires the attack scenarios identified by the attack scenario numbers S01, S02, and so on.

Then, the prediction unit 1 acquires the attack communication data which is the communication data corresponding to the attack-module identifiers (ms10_061_spoolss, modbusclient, cve_2019_0708_bluekeep_rce) included in the attack scenarios.

Then, the prediction unit 1 changes (modifies) the transmission-source identifiers and the transmission-destination identifiers in the attack communication data according to the attack scenarios. For example, with respect to the attack-module identifier ms10_061_spoolss of the attack scenario number S01, the prediction unit 1 changes the transmission-source identifier "10.0.0.1" in the attack communication data to "192.168.0.2" and changes the transmission-destination identifier "10.0.0.2" in the attack communication data to "192.168.0.5" based on the attack-source identifier and the attack-target identifier of the attack scenario and the attack-source identifier and the attack-target identifier of the attack communication information.

In the end, the prediction unit 1 stores, as the attack means number A01, the attack-source identifier 192.168.0.2, the attack-target identifier 192.168.0.5, the attack-module identifier ms10_061_spoolss, and the communication prediction data in the above described communication-prediction-data storage unit 103 as illustrated in FIG. 5.

Then, the selection unit 21 acquires, from the communication-prediction-data storage unit 103, the data (the attack-source identifier 192.168.0.2, the attack-target identifier 192.168.0.5, the attack-module identifier ms10_061_spoolss, and the communication prediction data of this attack means) corresponding to the attack means number A01.

Also, the selection unit 21 acquires, from the normal-communication-data-model storage unit 104, the normal communication data model "Abaflteobf-e09kba" corresponding to 192.168.0.0/24 which is the network segment including the attack-source identifier 192.168.0.2 and the attack-target identifier 192.168.0.5.

Then, the determination unit 22 determines the similarity degree between the normal communication data represented by the normal communication data model "Abaflteobf-e09kba" and the communication prediction data.

In the above described example of FIG. 7, the similarity-degree determination result of the attack means identified by the attack means number A01 is 1 (similar). The determination unit 22 associates the attack means number A01, the attack-source identifier 192.168.0.2, the attack-target identifier 192.168.0.5, the attack-module identifier ms10_061_spoolss, and the similarity-degree determination result 1 and stores them in the determination-result storage unit 105.

On the other hand, the similarity-degree determination result of the attack means identified by the attack means number A03 is 0 (not similar). The determination unit 22 associates the attack means number A03, the attack-source identifier 192.168.0.2, the attack-target identifier 192.168.0.8, the attack-module identifier cve_2019_0708_bluekeep_rce, and the similarity-degree determination result 0 and stores them in the determination-result storage unit 105.

The calculation unit 23 acquires the attack scenario numbers S01, S02, and so on from the attack-scenario storage unit 101.

The calculation unit 23 acquires, from the determination-result storage unit 105, the similarity-degree determination result 1 of the attack means "the attack-source identifier 192.168.0.2, the attack-target identifier 192.168.0.5, and the attack-module identifier ms10_061_spoolss" included in the attack scenario of the attack scenario number S01. Also, the calculation unit 23 acquires, from the attack-scenario storage unit 101, the similarity-degree determination result 1 of the attack means "the attack-source identifier 192.168.1.5, the attack-target identifier 192.168.1.10, and the attack-module identifier modbusclient" included in the attack scenario of the attack scenario number S01. Then, the calculation unit 23 computes the effectiveness degree of the attack scenario of the attack scenario number S01 by 1*1=1.

On the other hand, the calculation unit 23 acquires, from the determination-result storage unit 105, the similarity-degree determination result 0 of the attack means "the attack-source identifier 192.168.0.2, the attack-target identifier 192.168.0.8, and the attack-module identifier cve_2019_0708_bluekeep_rce" included in the attack scenario of the attack scenario number S02. Also, the calculation unit 23 acquires, from the determination-result storage unit 105, the similarity-degree determination result 1 of the attack means "the attack-source identifier 192.168.1.8, the attack-target identifier 192.168.1.10, and the attack-module identifier modbusclient" included in the attack scenario of the attack scenario number S02. Then, the calculation unit 23 computes the effectiveness degree of the attack scenario of the attack scenario number S02 by 0.1*1=0.1.

In the end, the calculation unit 23 stores (the attack scenario number S01, the effectiveness degree 1) and (the attack scenario number S02, the attack scenario effectiveness degree 0.1) in the effectiveness-degree storage unit 106.

As described above, in the information processing device 100 of the first embodiment, the normal-communication-data-model storage unit 104 associates and stores the normal communication data models, which represent the models of communication data of normal systems, with the respective network segments. The selection unit 21 specifies a network segment based on the communication prediction data predicted upon execution of the attack scenario and selects the normal communication data model associated with the network segment. The determination unit 22 determines the similarity degree between the normal communication data, which is represented by the normal communication data model, and the communication prediction data. Then, the calculation unit 23 calculates the effectiveness degree of the attack scenario to be higher as the similarity degree is higher.

By virtue of this, according to the information processing device 100 of the first embodiment, even in a system which has multi-level network segments, the resistance against cyber attacks can be evaluated with high accuracy.

Specifically, according to the information processing device 100 of the first embodiment, attack scenarios which can be hidden in normal communication can be extracted from the similarity degree between the communication prediction data of the attack means and the communication data of the normal systems in the network segments.

In a system such as a control system which has multi-level network segments, the normal communication used in each network segment is often different. In the conventional method which uses a single normal-state model and a method which uses simple attack paths, it has been difficult to reflect the characteristics of the single normal-state model and the characteristics of the simple attack paths to the system which has multi-level network segments.

On the other hand, in the information processing device 100 of the first embodiment, for example, in the case of the data example of the effectiveness-degree storage unit 106 of FIG. 8, the effectiveness degree of the attack scenario of the attack scenario number S01 having a high similarity degree with the communication data of the normal system is high. On the other hand, the effectiveness degree of the attack scenario of the attack scenario number S02 having a low similarity degree with the communication data of the normal system is low. In other words, the attack scenario of the attack scenario number S02 including part of the attack means which is detected by IDS or the like has a low effectiveness degree. More specifically, it can be understood that a measure for improving the resistance against the attack scenario of the attack scenario number S01 has to be taken in the attack-evaluation-target system 200.

Also, in the first embodiment, since the normal communication data model is used for each network segment, similarity degree determination corresponding to the communication data flowing in the network segment can be carried out. Therefore, the value of the effectiveness degree of the attack scenario becomes more suitable for the attack-evaluation-target system 200.

In the present embodiment, IP addresses are used as the attack-source identifiers and the attack-target identifier however, for example, MAC addresses, node IDs, and station IDs may be used as the attack-source identifiers and the attack-target identifiers.

Moreover, in the present embodiment, when the prediction unit 1 predicts the communication prediction data, only the transmission-source identifiers and the transmission-destination identifiers are changed. However, data other than the transmission-source identifiers and the transmission-destination identifiers may be further changed. For example, if the payload of the attack communication data includes the data which depends on the transmission-source identifier, the transmission-destination identifier, the transmission-source identifier, and the transmission-destination identifier, the payload can be also changed to an appropriate value. In addition, when the prediction unit 1 predicts the communication prediction data, the time included in the communication prediction data may be also appropriately corrected according to the flow of communication data.

Furthermore, in the present embodiment, the selection unit 21 acquires the normal communication data model supporting the network segment including the attack-source identifier and the attack-target identifier. However, the normal communication data model supporting the network segment including the transmission-source identifier and the transmission-destination identifier included in the communication prediction data may be acquired. More specifically, the selection unit 21 may specify the network segment according to the transmission-source identifier and the transmission-destination identifier and select the normal communication data model associated with the network segment.

The normal-communication-data-model storage unit 104 of the present embodiment has the normal communication data models respectively for the network segments. However, the method of storing the normal communication data models is not limited to this method. For example, the method of storing the normal communication data model may be a method in which one or more identifiers and a normal communication data model are stored as a pair. The one or more identifier(s) are the attack-source identifiers and the values (for example, IP addresses, MAC addresses, etc.) used in the attack-source identifiers. The selection unit 21 in that case acquires the normal communication data model supporting the attack-source identifier and the attack-target identifier.

The calculation unit 23 of the present embodiment carries out multiplication with 1 if the similarity degree is 1 and carries out multiplication with 0.1 if the similarity degree is 0. However, the computation method is not limited thereto. For example, in an employable method, multiplication is carried out with 0.5 if the similarity degree is 1, and multiplication is carried out with 0.1 if the similarity degree is 0. For example, in another employable method, 100 is provided as an initial value of the effectiveness degree, the value is not changed if the similarity degree is 1, and 1 is subtracted from the value if the similarity degree is 0.

Second Embodiment

Next, a second embodiment will be described. In the descriptions of the second embodiment, the descriptions similar to the first embodiment are omitted, and the part different from the first embodiment will be described. In the first embodiment, the effectiveness degree of the attack scenario is computed after the attack scenario is divided into one or more attack means. However, in the present embodiment, a case in which the effectiveness degree of the attack scenario is computed without dividing the attack scenario into attack means.

Example of Functional Configuration

Figure 10:
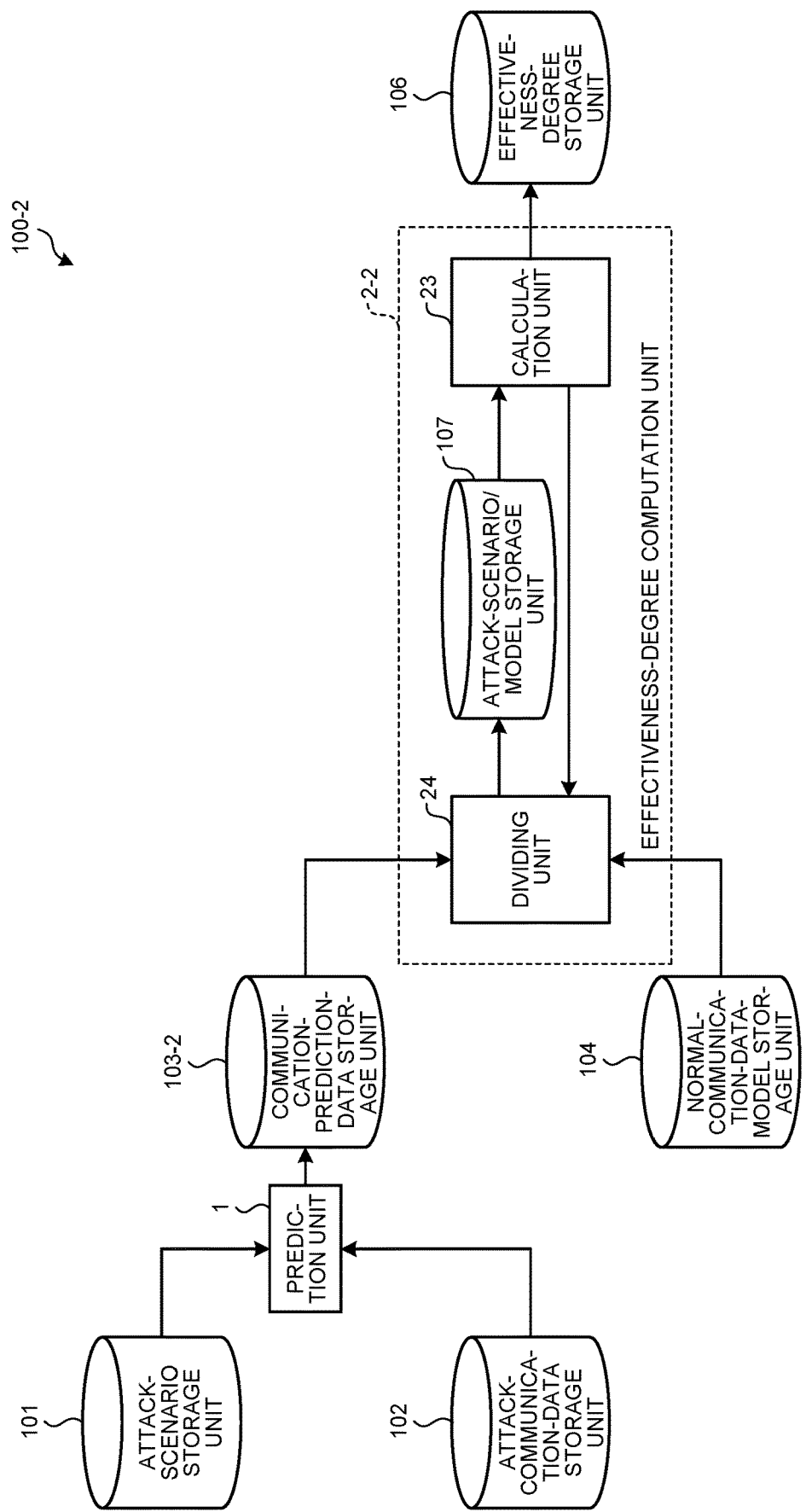
FIG. 10 is a diagram illustrating a functional configuration of an information processing device of a second embodiment.

FIG. 10 is a diagram illustrating an example of a functional configuration of an information processing device 100-2 of a second embodiment. The information processing device 100-2 of the second embodiment is provided with the prediction unit 1, an effectiveness-degree computation unit 2-2, the attack-scenario storage unit 101, the attack-communication-data storage unit 102, a communication-prediction-data storage unit 103-2 (FIG. 11), a normal-communication-data-model storage unit 104, and the effectiveness-degree storage unit 106.

The descriptions of the attack-scenario storage unit 101, the attack-communication-data storage unit 102, the normal-communication-data-model storage unit 104, and the effectiveness-degree storage unit 106 of the second embodiment are similar to those of the first embodiment and are therefore omitted.

In the second embodiment, the prediction unit 1 stores the communication prediction data (time, transmission-source identifiers, transmission-destination identifiers, and payload) is stored in the communication-prediction-data storage unit 103-2 for respective attack scenario numbers.

Data Example of Communication-Prediction-Data Storage Unit

FIG. 11 is a diagram illustrating a data example of the communication-prediction-data storage unit 103-2 of the second embodiment. The data of the communication-prediction-data storage unit 103-2 of the second embodiment includes at least the attack scenario numbers and the communication prediction data. The descriptions of the attack scenario number are the same as those of FIG. 2 and are therefore omitted.

The communication prediction data includes at least time, a transmission-source identifier, a transmission-destination identifier, and payload of each communication predicted by the prediction unit 1. The descriptions of the time, the transmission-source identifiers, the transmission-destination identifiers, and the payload are the same as those of FIG. 4 and are therefore omitted.

FIG. 11 illustrates the communication prediction data supporting various attack scenarios. For example, an attack scenario of an attack scenario number S01 includes communication prediction data C001, C002, C100, C101, C102, C150, and so on.

Returning to FIG. 10, the effectiveness-degree computation unit 2-2 is provided with the calculation unit 23, a dividing unit 24, and an attack-scenario/model storage unit 107 (FIG. 12).

The dividing unit 24 divides the plural pieces of communication prediction data associated with the attack scenario number into two or more and associates each divided piece of the communication prediction data with a different normal communication data model.

Data Example of Attack-Scenario/Model Storage Unit

FIG. 12 is a diagram illustrating a data example of the attack-scenario/model storage unit 107 of the second embodiment. The data of the attack-scenario/model storage unit 107 of the second embodiment includes at least the communication prediction data and the normal communication data model. The communication prediction data corresponds to the communication prediction data of FIG. 11. The descriptions of the normal communication data model are the same as those of FIG. 6 and are therefore omitted.

The attack-scenario/model storage unit 107 of the second embodiment stores one or more pieces of communication prediction data, which are generated in the attack scenario, and the normal communication data models corresponding to the communication prediction data. In the example of FIG. 12, for example, the communication prediction data C001 to C100 and the normal communication data model "Abaflteobf-e09kba" are associated and stored.

Example of Information Processing Method

Figure 13:
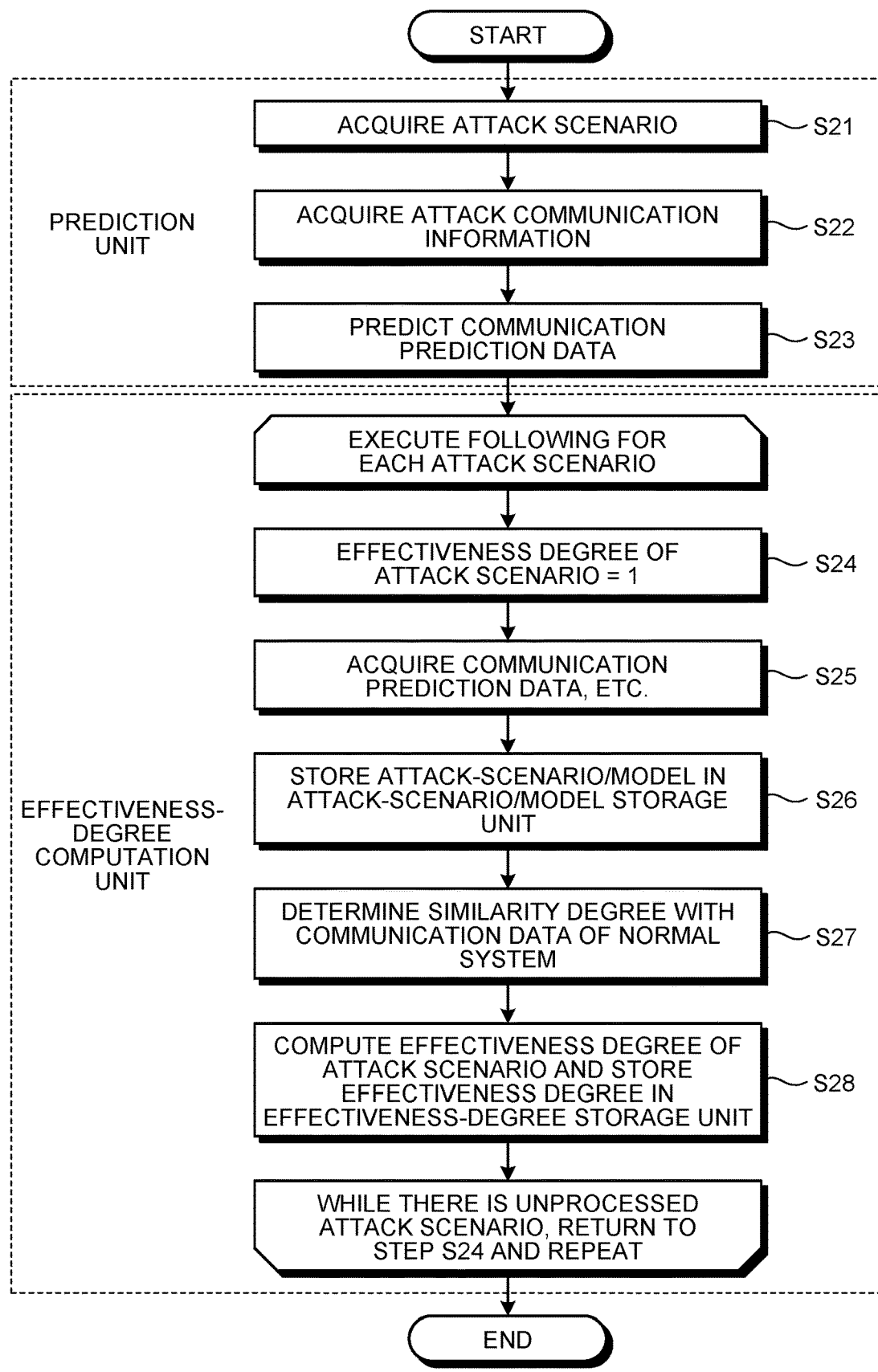
FIG. 13 is a flow chart illustrating an example of an information processing method of the second embodiment.

FIG. 13 is a flow chart illustrating an example of an information processing method of the second embodiment. The descriptions of steps S21 and S22 are similar to those of steps S1 and S2 (see FIG. 9) of the first embodiment and are therefore omitted.

The prediction unit 1 predicts communication prediction data based on the transmission-source identifiers and the transmission-destination identifiers of the attack communication data of the attack-communication-data storage unit 102 and based on the attack-source identifiers and the attack-target identifiers of the attack scenario (step S23). In the second embodiment, the prediction unit 1 stores the communication prediction data (time, transmission-source identifiers, transmission-destination identifiers, and payload) is stored in the communication-prediction-data storage unit 103-2 for respective attack scenario numbers.

Next, the effectiveness-degree computation unit 2-2 (the calculation unit 23 and the dividing unit 24) executes the following for each attack scenario. First, the calculation unit 23 sets the effectiveness degree of the attack scenario to 1 (step S24).

Then, the dividing unit 24 acquires, from the communication-prediction-data storage unit 103-2, the communication prediction data (time, the transmission-source identifiers, the transmission-destination identifiers, and payload), etc. associated with the attack scenario number of the attack scenario of a processing target (step S25).

Then, the dividing unit 24 acquires the normal communication data models from the normal-communication-data-model storage unit 104 based on the transmission-source identifiers and the transmission-destination identifiers acquired in step S25. Then, the dividing unit 24 stores an attack-scenario/model, in which the communication prediction data and the normal communication data model is associated, in the attack-scenario/model storage unit 107 (step S26).

For example, in the case of the communication prediction data exemplified in FIG. 11, the dividing unit 24 groups the communication prediction data C001 to C100 into one and associates the data with "Abaflteobf-e09kba" as a normal communication data model. Also, the dividing unit 24 groups the communication prediction data C101 to C150 into one and associates the data with "04ktb;glagAfgar03" as a normal communication data model. More specifically, in the example of FIG. 11, the plural pieces of communication prediction data associated with the attack scenario number S01 are divided into two groups, and each group is associated with a different normal communication data model.

Then, the calculation unit 23 acquires the normal communication data models and the communication prediction data from the attack-scenario/model storage unit 107 and determines the similarity degree between the normal communication data, which is represented by the normal communication data, and the communication prediction data (step S27). Then, the calculation unit 23 calculates (computes) the effectiveness degree of the attack scenario and stores the effectiveness degree in the effectiveness-degree storage unit 106 (step S28). Specifically, for example, if it is determined that the similarity degree is 0 in the process of step S27, the calculation unit 23 multiplies the effectiveness degree of the attack scenario by 0.1. The initial value of the effectiveness degree may be arbitrary. For example, the initial value of the effectiveness degree is 1. When the calculation of the similarity degree and the calculation of the effectiveness degree based on the similarity degree are finished for all the communication prediction data associated with the attack scenario of the processing target, the calculation unit 23 pairs the computed effectiveness degree with the attack scenario number and stores that in the effectiveness-degree storage unit 106.

While there is an unprocessed attack scenario(s), the effectiveness-degree computation unit 2-2 (the calculation unit 23 and the dividing unit 24) returns to step S24 and repeats the processes of steps S24 to S28.

As described above, in the second embodiment, the attack scenarios which can be hidden in normal communication can be extracted without separating the attack scenario into attack means. Also in the present embodiment, similarity degree determination corresponding to the communication data flowing in the network segment can be carried out by appropriately selecting the normal communication data model according to the communication prediction data. Therefore, the value of the effectiveness degree of the attack scenario can be caused to be more suitable for the attack-evaluation-target system.

Third Embodiment

Next, a third embodiment will be described. In the descriptions of the third embodiment, the descriptions similar to the first embodiment are omitted, and the part different from the first embodiment will be described. In the first embodiment, the determination of the similarity degree is carried out by using all fields of the communication prediction data. However, in a case in which there is a field with bad prediction accuracy, the determination of the similarity degree may be affected. In the third embodiment, a case in which the field(s) with bad prediction accuracy is eliminated from the fields of the communication prediction data to improve the determination accuracy of the similarity degree will be described.

Example of Device Configuration

Figure 14:
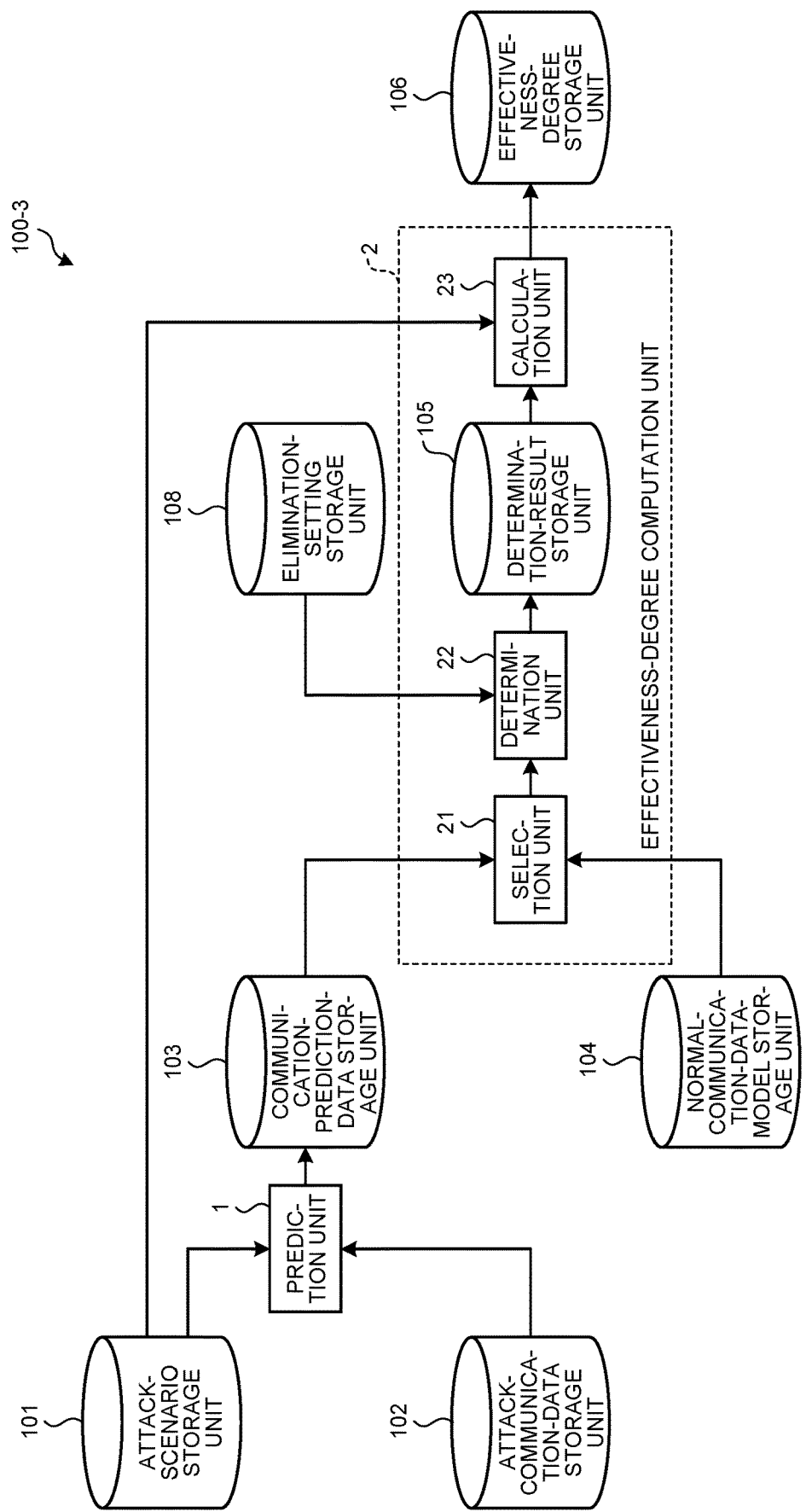
FIG. 14 is a diagram illustrating an example of a functional configuration of an information processing device of a third embodiment.
Figure 15:
FIG. 15 is a diagram illustrating a data example of an elimination-setting storage unit of the third embodiment.

FIG. 14 is a diagram illustrating an example of a functional configuration of an information processing device 100-3 of the third embodiment. The information processing device 100-3 of the third embodiment is provided with the prediction unit 1, the effectiveness-degree computation unit 2, the attack-scenario storage unit 101 (FIG. 2), the attack-communication-data storage unit 102 (FIG. 4), the communication-prediction-data storage unit 103 (FIG. 5), the normal-communication-data-model storage unit 104 (FIG. 6), the effectiveness-degree storage unit 106 (FIG. 8), and an elimination-setting storage unit 108 (FIG. 15). The effectiveness-degree computation unit 2 is provided with a selection unit 21, a determination unit 22, a calculation unit 23, and a determination-result storage unit 105 (FIG. 7).

In the third embodiment, the determination unit 22 specifies an elimination-target field name(s), which is not to be used in the communication prediction data for the similarity degree determination, based on the data stored in the elimination-setting storage unit 108 and determines the similarity degree with normal communication without using the elimination-target field name.

Data Example of Elimination-Setting Storage Unit

FIG. 15 is a diagram illustrating a data example of the elimination-setting storage unit of the third embodiment. The data of the elimination-setting storage unit 108 of the third embodiment includes at least an elimination-target field name. The elimination-target field name represents the name of the field which is not to be used for the similarity degree determination among the fields of the communication prediction data. In the example of FIG. 15, the field of time is set as the elimination-target field name. This is for a reason that, in the example of the third embodiment, if differences in time are taken into consideration of the similarity degree determination with the normal communication, the possibility of deteriorating the determination accuracy of the similarity degree is conceived to be high since the time at which communication is carried out may be arbitrary.

Example of Information Processing Method

Figure 16:
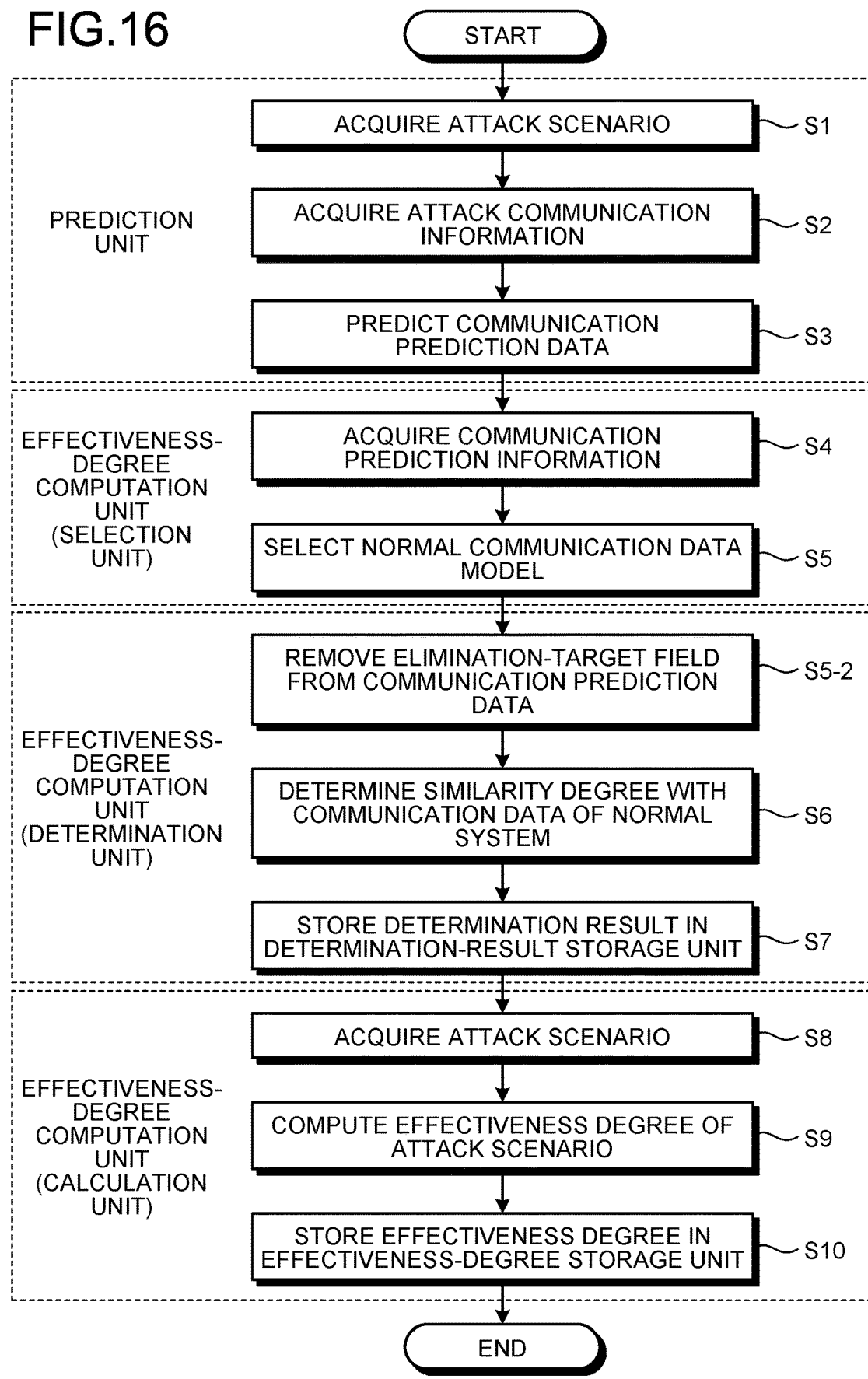
FIG. 16 is a flow chart illustrating an example of an information processing method of the third embodiment.

FIG. 16 is a flow chart illustrating an example of an information processing method of the third embodiment. FIG. 16 is different from the flow chart of the first embodiment (see FIG. 9) in a point that step S5-2 is added.

In step S5-2, the determination unit 22 acquires the elimination-target field names from the elimination-setting storage unit 108 and removes the elimination target field, which are specified by the elimination-target field names, from the communication prediction data acquired in step S4.

Then, the determination unit 22 uses the communication prediction data, which has been changed by the process of step S5-2, and the normal communication data model to determine the similarity degree with the communication data of the normal system (step S6). Then, the effectiveness degree of each attack scenario is computed based on the determination result of the similarity degree like the first embodiment.

The example of FIG. 16 describes the method in which the elimination target fields are eliminated from the communication prediction data before application of the normal communication data model. However, the elimination method is not limited to this method. For example, in a case in which the similarity-degree determination result obtained by using the normal communication data model and the communication prediction data is affected by the elimination field, a method of correcting the similarity-degree determination result is also conceivable.

Specifically, for example, the determination unit 22 determines a first similarity degree which represents the similarity degree between the normal communication data, which is represented by the normal communication data model, and the communication prediction data. Also, the determination unit 22 determines a second similarity degree which represents the similarity degree between the normal communication data, which is represented by the normal communication data model, and the communication prediction data for which the elimination target field has been eliminated. Then, the calculation unit 23 calculates the effectiveness degree of the attack scenario to be higher as the first similarity degree is higher and corrects the effectiveness degree according to the difference between the first similarity degree and the second similarity degree. For example, the calculation unit 23 higher-corrects the effectiveness degree as the second similarity degree is higher than the first similarity degree.

If the difference between the first similarity degree and the second similarity degree is larger than a threshold value, the calculation unit 23 corrects the effectiveness degree; and, if the difference is equal to or lower than the threshold value, the calculation unit 23 is not required to correct the effectiveness degree.

Also, for example, in a case in which an attack detection system (IDS) is used for the similarity-degree determination result, a method that subjects the attack detection system to setting of the field to be eliminated and then determines the presence/absence of attack detection by using the normal communication data model and the communication prediction data is also conceivable.

As described above, in the third embodiment, the effectiveness degree of the attack scenario can be computed by using the data having higher prediction accuracy by carrying out the similarity degree determination according to the prediction accuracy of the communication prediction data. Therefore, the value of the effectiveness degree of the attack scenario can be caused to be more suitable for the attack-evaluation-target system.

In the end, a hardware configuration of the information processing device 100 (100-2, 100-3) of the first to third embodiments will be described.

Example of Hardware Configuration

Figure 17:
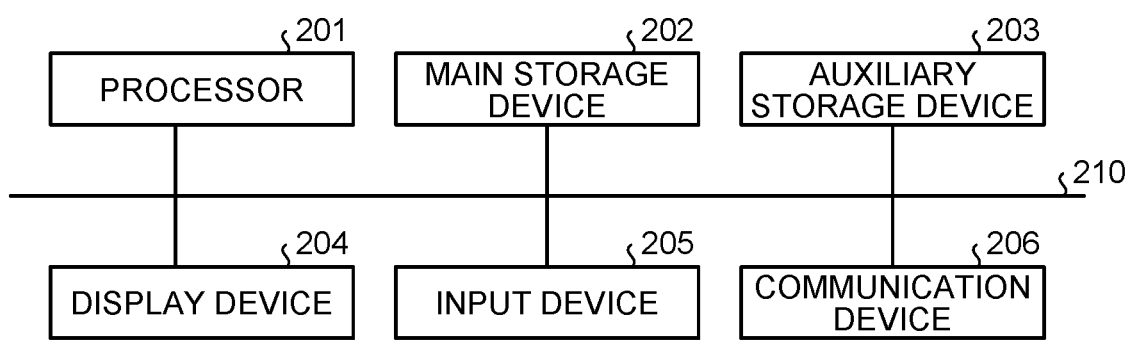
FIG. 17 is a diagram illustrating an example of a hardware configuration of an attack control device of the first to third embodiments.

FIG. 17 is a diagram illustrating an example of a hardware configuration of the information processing device 100 (100-2, 100-3) of the first to third embodiments. The information processing device 100 (100-2, 100-3) of the first to third embodiments is provided with a processor 201, a main storage device 202, an auxiliary storage device 203, a display device 204, an input device 205, and a communication device 206. The processor 201, the main storage device 202, the auxiliary storage device 203, the display device 204, the input device 205, and the communication device 206 are connected via a bus 210.

The information processing device 100 (100-2, 100-3) is not required to be provided with part of the above described configuration. For example, if the information processing device 100 (100-2, 100-3) can use an input function and a display function of an external device, the information processing device 100 (100-2, 100-3) is not required to be provided with the display device 204 and the input device 205.

The processor 201 executes a program read from the auxiliary storage device 203 to the main storage device 202. The main storage device 202 is a memory such as a ROM, RAM, etc. The auxiliary storage device 203 is a hard disk drive (HDD), a memory card, etc.

The display device 204 is, for example, a liquid-crystal display or the like. The input device 205 is an interface for operating the information processing device 100. The display device 204 and the input device 205 may be realized by, for example, a touch screen which has a display function and an input function. The communication device 206 is an interface for communicating with another device.

The program executed in the information processing device 100 (100-2, 100-3) is recorded as a file having an installable format or an executable format in a computer-readable storage medium such as a CD-ROM, a memory card, a CD-R, a DVD, etc. and is provided as a computer program product.

The program executed in the information processing device 100 (100-2, 100-3) may be configured to be stored in a computer connected to a network such as the Internet and provided by downloading via the network. The program executed in the information processing device 100 (100-2, 100-3) may be configured to be provided via a network such as the Internet instead of downloading the program.

Also, the program of the information processing device 100 (100-2, 100-3) may be configured to be provided in a manner that the program is incorporated in a ROM or the like in advance.

The program executed in the information processing device 100 (100-2, 100-3) has a module configuration including the functions of the functional configuration of above described FIG. 1 (FIG. 10, FIG. 14) which can be realized by the program. Regarding the functions, as actual hardware, the above described functional blocks are loaded to the main storage device 202 when the processor 201 reads and executes the program from the storage medium. In other words, the above described functional blocks are generated in the main storage device 202.

Part or all of the above described functions of FIG. 1 (FIG. 10, FIG. 14) may be realized by hardware such as IC instead of realizing the functions by software.

Also, the functions may be realized by using plural processors 201. In such a case, each processor 201 may realize one of the functions or may realize two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   a storage unit configured to associate and store a normal communication data model with each network segment, the normal communication data model representing a model of communication data of a normal system; and
   one or more hardware processors configured to function as:
   a selection unit configured to specify a network segment based on communication prediction data predicted upon execution of an attack scenario and select the normal communication data model associated with the network segment;
   a determination unit configured to determine a similarity degree between the normal communication data represented by the normal communication data model and the communication prediction data; and
   a calculation unit configured to calculate an effectiveness degree of the attack scenario to be higher as the similarity degree is higher,
   wherein
   the attack scenario includes a first attack-source identifier identifying a first attack source, a first attack-target identifier identifying a first attack target, and an attack-module identifier identifying an attack module, and
   the one or more hardware processors are configured to further function as a prediction unit configured to predict the communication prediction data according to attack communication data, the first attack-source identifier, and the first attack-target identifier, the attack communication data representing communication data of a case in which the attack module identified by the attack-module identifier is executed.

2. The information processing device according to claim 1, wherein
   the communication prediction data is associated with the first attack-source identifier and the first attack-target identifier, and
   the selection unit specifies the network segment according to the first attack-source identifier and the first attack-target identifier and selects the normal communication data model associated with the network segment.

3. The information processing device according to claim 1, wherein the communication prediction data includes at least one piece of prediction data of communication identified by a first transmission-source identifier identifying a first transmission source and a first transmission-destination identifier identifying a first transmission destination, and the selection unit specifies the network segment according to the first transmission-source identifier and the first transmission-destination identifier and selects the normal communication data model associated with the network segment.

4. The information processing device according to claim 3, wherein
   the attack communication data includes at least one attack packet identified by a second transmission-source identifier identifying a second transmission source and a second transmission-destination identifier identifying a second transmission destination, and the prediction unit predicts the communication prediction data by changing the second transmission-source identifier to the first transmission-source identifier and changing the second transmission-destination identifier to the first transmission-destination identifier based on the first attack-source identifier and the first attack-target identifier.

5. The information processing device according to claim 1, wherein the communication prediction data includes plural fields, the one or more hardware processors are configured to further function as an elimination-setting storage unit configured to store an elimination target field serving as an elimination target among the plural fields, and the determination unit determines a similarity degree between the normal communication data represented by the normal communication data model and the communication prediction data for which the elimination target field is eliminated.

6. The information processing device according to claim 5, wherein the elimination target field is a field of time of the communication prediction data.

7. The information processing device according to claim 1, wherein the communication prediction data includes plural fields, the one or more hardware processors are configured to further function as an elimination-setting storage unit configured to store an elimination target field serving as an elimination target among the plural fields, the determination unit determines a first similarity degree representing the similarity degree between the normal communication data represented by the normal communication data model and the communication prediction data and determines a second similarity degree representing a similarity degree between the normal communication data represented by the normal communication data model and the communication prediction data for which the elimination target field is eliminated, and the calculation unit calculates the effectiveness degree of the attack scenario to be higher as the first similarity degree is higher, and corrects the effectiveness degree according to a difference between the first similarity degree and the second similarity degree.

8. The information processing device according to claim 7, wherein, when the difference between the first similarity degree and the second similarity degree is larger than a threshold value, the calculation unit corrects the effectiveness degree and, and when the difference is equal to or lower than the threshold value, the calculation unit does not correct the effectiveness degree.

9. A computer program product having a non-transitory computer readable medium including programmed instructions stored therein, wherein the instructions, when executed by a computer including a storage unit configured to associate and store a normal communication data model representing a model of communication data of a normal system with each network segment, cause the computer to perform a method comprising:

specifying a network segment based on communication prediction data predicted upon execution of an attack scenario, wherein the attack scenario includes a first attack-source identifier identifying a first attack source, a first attack-target identifier identifying a first attack target, and an attack-module identifier identifying an attack module;

selecting the normal communication data model associated with the network segment;

determining a similarity degree between the normal communication data represented by the normal communication data model and the communication prediction data;

calculating an effectiveness degree of the attack scenario to be higher as the similarity degree is higher; and predicting the communication prediction data according to attack communication data, the first attack-source identifier, and the first attack-target identifier, the attack communication data representing communication data of a case in which the attack module identified by the attack-module identifier is executed.

10. An information processing device comprising:

a storage unit configured to associate and store a normal communication data model with each network segment, the normal communication data model representing a model of communication data of a normal system; and one or more hardware processors configured to perform a method comprising:

specifying a network segment based on communication prediction data predicted upon execution of an attack scenario, wherein the attack scenario includes a first attack-source identifier identifying a first attack source, a first attack-target identifier identifying a first attack target, and an attack-module identifier identifying an attack module;

selecting the normal communication data model associated with the network segment;

determining a similarity degree between the normal communication data represented by the normal communication data model and the communication prediction data;

calculating an effectiveness degree of the attack scenario to be higher as the similarity degree is higher; and predicting the communication prediction data according to attack communication data, the first attack-source identifier, and the first attack-target identifier, the attack communication data representing communication data of a case in which the attack module identified by the attack-module identifier is executed.

* * * * *